April 21, 1936.  E. E. WEISS  2,038,460
AUDIBLE MECHANICAL TOY

Original Filed June 19, 1934

Edmund E. Weiss INVENTOR
BY Victor J. Evans &Co
ATTORNEYS

Patented Apr. 21, 1936

2,038,460

UNITED STATES PATENT OFFICE 2,038,460

AUDIBLE MECHANICAL TOY

Edmund E. Weiss, Ventnor City, N. J.

Application June 19, 1934, Serial No. 731,368
Renewed September 23, 1935

1 Claim. (Cl. 46—118)

This invention relates to an improved mechanical toy of the audible animal type in simulation to a donkey or mule, and it has for its purpose to provide a toy, which can also be used as an ornament, due to the fact that it acts as a support for an ash tray, and which is also amusing, due to the fact that when the tail of the animal or toy is moved up and down the lower jaw of the animal moves, the lower jaw thereof also having a cutting blade at the mouth portion of the animal for cutting ends of cigars.

Another purpose is to provide an article of manufacture of this kind, wherein when the tail is moved up and down and the lower jaw operated, as though the donkey or mule is opening and closing its mouth, an audible sound is created in simulation to a mule hee hawing.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1:
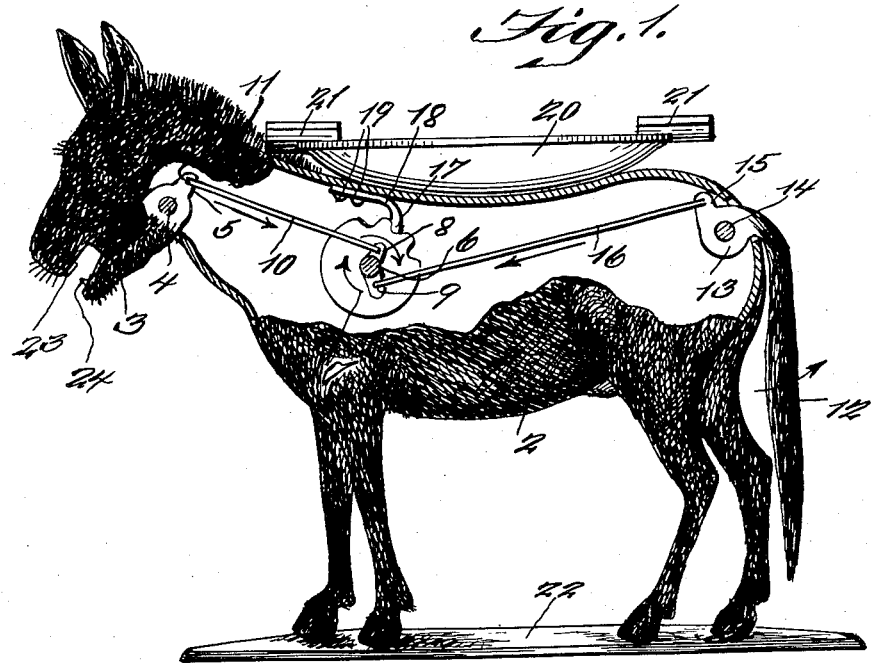
Figure 1 is a view in side elevation with a portion of the hollow body of the animal broken away and in section, showing the mechanism for imparting movement to the lower jaw and creating an audible sound in simulation to a donkey or mule hee hawing.

Referring to the drawing the body 2 of the toy in simulation to a donkey or mule is hollow for the purpose of containing a mechanism for creating an audible sound as well as moving the lower jaw 3 of the animal as the sound is created. The lower jaw is pivoted at 4, and the pivoted part of the jaw has an arm 5.

Mounted in bearings of opposite sides of the body 2 of the toy is a shaft 6, which carries a toothed wheel and two arms 8 and 9. The arm 8 is connected by a link or rod 10 in turn connected at 11 to the arm 5. The tail 12 of the donkey or mule has a circular portion 13 pivoted upon a transverse pin 14, the circular portion 13 of the tail being provided with an arm 15. A rod or link 16 connects the arm 9 and the arm 15. Obviously by moving the tail 12 of the donkey or mule up and down the lower jaw 3 of the donkey or mule can open and close. A head 17 of a resilient element 18 secured at 19 on the inside of the wall of the hollow body of the donkey, rides over the teeth of the wheel 7, so that when the tail 12 of the donkey is moved up and down, the teeth of the wheel 7 move back and forth under the yieldable element 18 and creates a noise somewhat in simulation to hee hawing of the mule or donkey.

Figure 2:
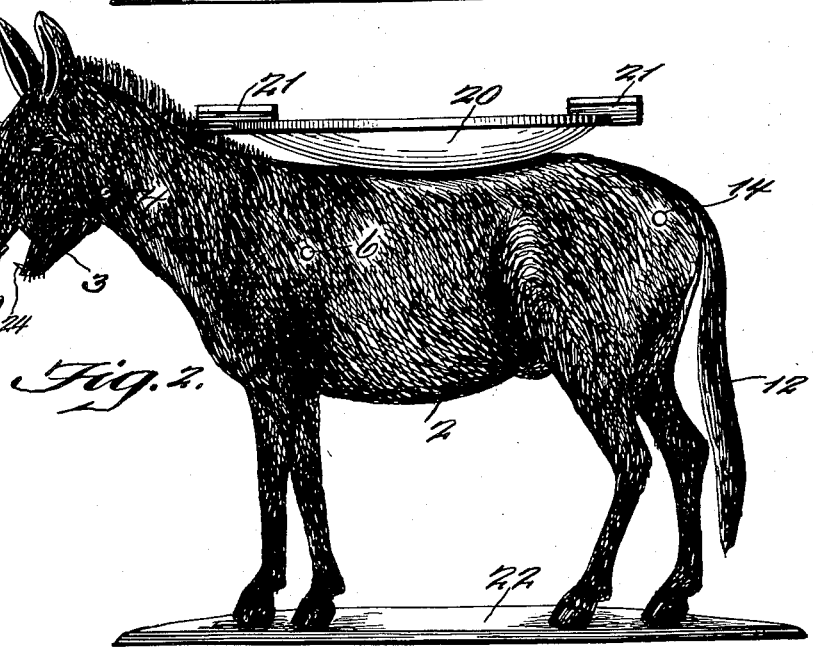
Figure 2 is a view in side elevation showing an ash tray as mounted on the back of the animal.

Also mounted on the body of the toy is an ash tray 20 shown in Figure 2, made as a part of the body of the toy or ornament, and at diametrically opposite points on the ash tray are holders 21 for a cigarette or cigar. The legs of the animal are mounted on a base 22, to insure that the animal may stand upright.

The invention having been set forth, what is claimed is:

In an audible mechanical toy in simulation to an animal substantially as specified, a hollow body having an animal head provided with a movable jaw pivoted thereon, and a movable tail pivoted at the rear, and means in the hollow body operatively connecting the pivoted portions of the tail and the jaw, whereby upon moving the tail up and down opening and closing movements may be imparted to the jaw, said means comprising a transverse shaft in bearings of the opposite sides of the hollow body, said shaft having upper and lower radial arms, a link connected to one of the arms and in turn connected to the pivoted part of the jaw, a second link connected to the other arm and in turn connected to the pivoted part of the tail, a toothed element on said shaft, and a yieldable device carried by the upper wall of the body and adapted to ride over the toothed element for creating an audible sound substantially in simulation to hee hawing of a donkey.

EDMUND E. WEISS.